June 22, 1948.　　　A. C. WILLIAMS　　　2,444,014
DISTRIBUTOR TESTING APPARATUS AND CIRCUIT
Filed Nov. 23, 1945　　　　　　　　　　　　2 Sheets-Sheet 1
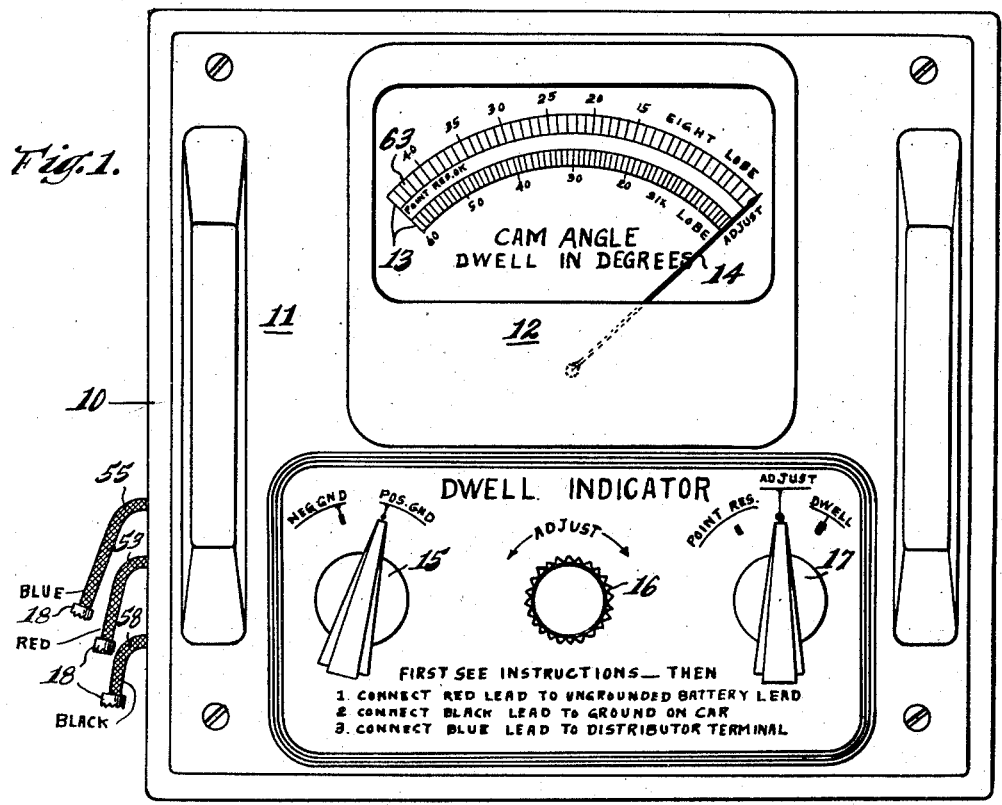
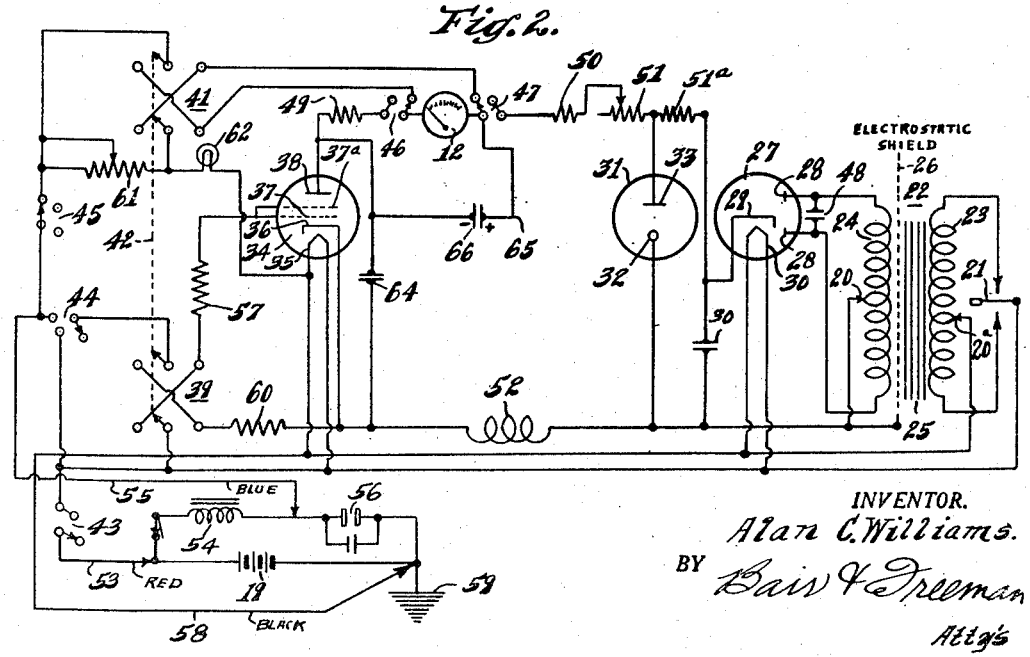
INVENTOR.
Alan C. Williams.
BY Bair & Freeman
Atty's Patented June 22, 1948

2,444,014

UNITED STATES PATENT OFFICE 2,444,014

DISTRIBUTOR TESTING APPARATUS AND CIRCUIT

Alan C. Williams, Minneapolis, Minn., assignor to Franklin Transformer Manufacturing Company, Minneapolis, Minn., a copartnership Application November 23, 1945, Serial No. 630,346

8 Claims. (Cl. 177—311)

The present invention relates to distributor testing apparatus and to an electric circuit for testing various characteristics of the contacts or points of the distributor of internal combustion engines, particularly contact resistance and cam angle. Included in the invention is a circuit for use with electronic devices which has general application where the only source of power is direct current.

It is an object of the invention to provide improved apparatus for testing the characteristics of the distributor of an internal combustion engine which may be connected, for example, to an automobile, and which will thereafter enable the mechanic to readily determine the contact resistance and cam or dwell angle of the contacts by direct observation of a single meter.

It is another object of the invention to provide a novel electrical circuit to accomplish the above objects and in general to provide an easy method of controlling and regulating a thyratron tube where direct current supply alone is available.

It is a further object of the invention to provide a distributor tester which derives its current entirely from the storage battery of the engine being tested and to eliminate the need for additional storage or dry cell batteries.

It is still another object of the invention to provide a novel meter circuit for a distributor tester which prevents serious meter overloads when testing contact resistance and allows the use of a large scale when operating on low voltage for measuring contact resistance.

It is still a further object of the invention to provide a distributor tester which will produce constant cam angle readings with varying input voltages and regardless of secondary loading by the coil and regardless of engine speed. Furthermore, the tester must not load the primary circuit of the engine ignition system to impair engine performance or to prevent starting.

It is also an object of the invention to provide for damping the meter of a distributor tester so as to allow readings at starter speeds, which damping is insufficient, however, to hide low frequency changes of dwell due to worn distributor parts.

It is another object of the invention to provide a simple, inexpensive distributor tester utilizing a minimum of parts which is easily understood and operated by the average automobile mechanic and wherein a number of tests may be made by the manipulation of suitable switches and the results clearly indicated on a meter scale.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Fig. 1 is a plan view of the control and instrument panel for the improved distributor tester;

Fig. 2 is an electro-diagram of the complete electrical circuit and electronic tubes utilized in the distributor tester;

Figure 3:
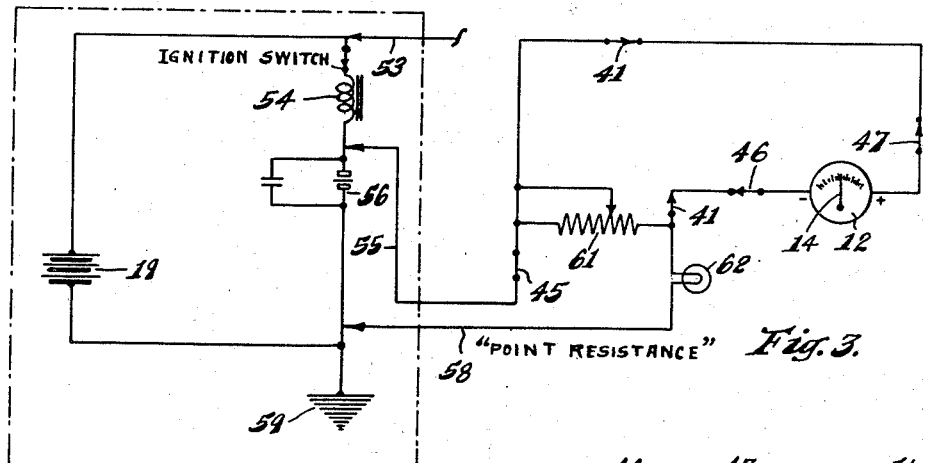
Fig. 3 is an electro-diagram of the active circuit when the tester is set to measure the resistance of the contacts or points of the distributor, the regulating vibrator portion of the circuit being omitted.

The dwell angle, or cam angle of a distributor may be determined by connecting a storage battery, a limiting resistor and a D. C. indicating meter in series with the contact points and determining the ratio between a current measurement taken with the contacts opening and closing periodically and a measurement taken with the contacts continuously closed. For example, in a distributor having an eight lobe cam, the limiting cam angle is 360 degrees divided by 8, or 45 degrees. If the measured ratio of meter indication is, for example, 69%, the cam angle is 69% of 45 degrees, or 31 degrees.

The intensity of the spark developed by an ignition coil depends on the current flowing in the coil primary at the time the contact points separate, and the magnitude of this current in turn depends on the time during which the primary is connected to the source of electrical energy, i. e. the storage battery, so that in measuring dwell or cam angle, the factor determining the time is measured, rather than an indirectly related factor such as the maximum linear separation of the contacts.

With a cam having a given number of lobes, the time during which the contacts are closed may also be expressed in the number of degrees of cam rotation during which the contacts are maintained closed for one cycle of operation. This is the general practice in the field of automotive instruments and the meter is, therefore, calibrated in terms of cam or dwell angle, rather than in percentage of contact closure time. The necessary switches and circuit for indicating cam angle are included in this invention.

When the contacts are open, the greatest current is flowing and when closed the least current is flowing. In order to obtain a correct average reading of the cam angle, the tester is provided with an adjusting position and a variable resistor. In the adjusting position the variable resistor is adjusted so that the meter reads exactly its minimum reading on the scale. This is more fully explained hereinafter.

When it is desired to determine the resistance of the points, which indicates either that the points are satisfactory or are badly burned or worn out, the meter with suitable shunt is connected in parallel with the ignition points with suitable resistance, and the tester is provided with the necessary switches and contacts to make this connection. In addition, a polarity switch is provided so that current of the proper polarity may be supplied to the tester regardless of which terminal of the battery is connected to the distributor and which to the ground.

Referring specifically to the drawings for a detailed description of the invention, as shown in Figure 1, numeral 11 indicates a control and instrument panel for a distributor tester 10 and includes a meter generally indicated at 12. The meter has a double scale 13, one scale being calibrated for eight lobe distributor cams and the other for six lobe cams. A pointer 14 is provided for the meter 12. Also mounted on the panel 11 is a polarity switch 15, an adjusting knob 16 and a selector switch 17. Three terminal clips 18 are also provided and for convenience the leads are marked "Blue," "Black" and "Red." These are connected to various conductors or terminals in the engine or vehicle to be tested, in a manner later described.

Referring now to Figures 2 to 5 inclusive, the main elements of the improved apparatus and circuit comprise a regulated vibrator system for providing a constant 105 volt direct current output from a storage battery 19, the voltage of which may vary from 4 to 8 volts of direct current. The regulated vibrator system is conventional and includes a vibrating reed 21, a transformer 22, including a primary coil 23, a secondary coil 24, a mid-point tap 20, a core 25, an electrostatic shield 26 and a rectifier tube 27.

The rectifier tube is preferably of the type known in the trade as "6 × 5GT" and includes two plates 28, a cathode 29 and a filament 30.

A glow tube voltage regulator 31 is also provided and includes a cathode 32 and a plate 33. The tube used is preferably one known in the trade as "VR105." A thyratron tube 34 is also in the circuit and includes a filament 35, a cathode 36, a control grip 37, a shield grid 37a and a plate 38. The thyratron tube preferably used is one known in the trade as "GL502." A pair of double pole, double throw polarity switches 39 and 41, operated by the single knob 15, as indicated by the dotted line 42, are also provided in the circuit. Single throw switches 43, 44, 45, 46 and 47, are provided to set the tester for cam angle readings, point resistance readings, or for adjusting, and are operated simultaneously by the single control knob 17. Resistors, condensers and chokes are provided and their functions will be described as the description of the circuit proceeds.

The theory of the circuit shown in Figures 2 and 5 for testing cam angle is as follows:

Since the power supply is derived from the storage battery 19 of the engine being tested, which delivers between 4 volts and 8 volts depending on whether the starter is being used or the engine is running with the generator (not shown) charging the battery, and since a high voltage of 105 volts is required, the following is used to develop the higher voltage. It is, of course, impossible to increase the direct current, battery voltage without first changing it to pulsating direct current. The vibrator including the vibrating reed 21 interrupts the direct current voltage in the primary coil 23 of the transformer and connects the battery voltage rapidly and alternately from one half of the primary winding 23 to the other half of the primary winding 23, a midpoint connection 20a being provided for this purpose. Since there are more turns on the secondary coil 24 of the transformer 22, and since the primary coil 23 sets up a rapidly changing flux in the transformer iron, a higher voltage is induced in the secondary coil 24 in the form of an alternating current voltage. The electrostatic shield 26 in the transformer 22 helps to prevent radio frequency interference from the arcing of the vibrator points from traveling through subsequent circuits with unwanted effects. A radio frequency choke 52 performs a similar function to the shield 26. A .02 microfarad buffer condenser 48 limits peak transient secondary voltages, improves transformer efficiency and limits vibrator arcing.

The rectifier tube 27, due to its unidirectional current qualities, rectifies or changes to pulsating direct current the alternating current from the secondary coil 24 of the transformer. A 16 microfarad filter condenser 30 reduces the amplitude of the pulsating D. C. ripple voltage and improves the stability of the voltage appearing across the voltage regulator tube 31. The tube 31 is so designed as to achieve practically a constant direct current voltage of 105 volts across the tube, for example, provided a current through the tube 31 is between 5 and 30 milliamperes. In other words, if a source of voltage such as the output from the vibrator circuit is connected across the tube 31 through a series resistance, the voltage drop will always be 105 volts, but the current may vary between 5 and 30 milliamperes. The function of the resistance 51a, which is preferably 10,000 ohms, is only to limit the current to a value between 5 and 30 milliamperes.

Since the cathode 36 of the thyratron tube 34 returns directly to the cathode of the voltage regulator tube and since the plate 38 of the thyratron tube 34 is connected through series resistors 49, 50 and 51 to the plate 33 of the regulator tube 31, 105 volts appear between the cathode 36 and the plate 38 of the thyratron tube only when no current is being drawn by the tube 34 through the series resistors 50 and 51 and the tube is extinguished. Now if we consider the grid 37 to be returned to the cathode 36 through a grid current-limiting 10,000 ohm grid resistor 57 and a 10,000 ohm filament to cathode limiting resistor 60, a zero bias would be achieved and the thyratron tube 34 would be in a conducting condition with approximately 11 volts appearing between cathode 36 and plate 38 of the thyratron tube and approximately 94 volts appearing between the plate 38 of the thyratron tube and the plate 33 of the regulator tube 31, thus illustrating that the thyratron tube plate resistance is approximately 10% of the total plate and series resistance circuit. Accordingly, if the temperature of the filament 35 of the thyratron tube 34 were to cause a 10% change in the plate resistance, because of its relatively small "10%" portion of the total circuit resistance, the total plate current, as read on meter 12 will change only an approximate 1%.

The changing battery voltage, described hereinbefore, may cause slight changes in the temperature of the filament 35 of the thyratron tube 34, but as will be apparent from the above description, the error so caused is very slight. Since in operating the tester, the current at plate 38 is adjusted once by use of the adjust knob 16, as more fully described hereinafter, and is then left untouched, while starter and running tests are being made, it is essential that any great changes in plate current, or "drift" be avoided to prevent errors in meter readings. The high series resistance, as stated before, consist of the fixed resistance 50 of 50,000 ohms and the variable resistance 51 of 50,000 ohms which is adjusted by adjust knob 16.

The meter, preferably of one milliampere rating, is in series with a 10,000 ohm resistor 49, both bridged by a 40 microfarad condenser 66 through a bridge 65, which resistor 49, provides, with the condenser 66, the damping circuit for the meter 12 for damping out excessive vibrations of the meter hand when testing dwell. The damping is not sufficient, however, to prevent accurate reading of the meter at starter speeds.

Referring again now to the thyratron tube circuit, if negative bias is introduced on the grid 37 thereof, remembering that a relatively high supply voltage of 105 volts is present, and the negative bias is increased slowly, it tends to decrease the ionization within the thyratron tube 34, thus decreasing the I. R. drop across the series plate resistances 50 and 51, and tends to increase the plate voltage of the tube 34, thereby demanding an even greater negative bias voltage to force the thyratron tube 34 into a non-conducting state. Thus, although the circuit has good plate current stability in the thyratron tube 34 the problem is to extinguish the thyratron tube 34 with a minimum of 4 volts, when actually the circuit so far described requires from 15 to 30 volts negative grid bias to render it non-conducting, with one milliampere of plate current flowing. Parenthetically, it is to be understood that the greater the plate current or rate of ionization of the thyratron tube 34, the more difficult it is to extinguish.

In alternating current applications, where an alternating current is applied between the plate and the cathode of a thyratron tube, it is a simple matter to hold the tube in a non-conducting condition with a small negative bias, as the plate voltage passes from the positive to the negative cycle. Once a thyratron tube is extinguished by any device, even very momentarily, a much lower bias voltage will hold it extinguished than would be required if a constant direct current voltage were applied to the plate.

In order to solve this problem, a similar condition is achieved by connecting a condenser 64, preferably of .002 microfarad, from plate 38 to cathode 36 of the thyratron tube, which results in producing a "relaxation oscillator." This means that initially current flows from the 105 volt source into the condenser 64, building it up in voltage at an exponential rate until it reaches the ionization or firing voltage of the thyratron tube 34, at which time it suddenly discharges its energy through the plate to cathode circuit of the thyratron tube 34 until the plate to cathode voltage drops to the extinguishing voltage. The cycle then starts repeating i. e., the condenser 64 again draws current through the series plate resistors 50 and 51, building up again towards firing voltage of the thyratron tube 34.

This cyclic action takes place at a frequency depending on the various circuit constants and the firing and extinguishing voltages of the thyratron tube 34. Since the thyratron tube is now being extinguished cyclically, in this particular instance about 14,000 times per second, it is easy to hold it out with a much lower bias voltage than heretofore, with a choice, theoretically of any one cycle. In other words, there is not over one cycle time delay, thus resulting in very rapid control, and, therefore, less error being introduced as a result of deionization time. Furthermore, it is not necessary to compensate the grid circuit with a compromise resistance-capacitance constant (known as an R. C. constant) because the error is never more than one cycle after the bias is applied until conduction ceases. Furthermore, there is no problem with the effects of wave shapes and amplitudes due to secondary loading of the ignition coil, because it is now possible to extinguish the tube within one cycle at the lowest bias of 4 volts and because the predominance of high voltage radio frequency resulting from the opening of the distributor points is of the same polarity as the desirable bias from the storage battery 19. It has been found by actual test that the total error due to secondary loading and the thyratron tube drift is well below 3%.

*Operation*

The regulated vibrator power supply and the filaments 30, 32 and 35 of the tubes 27, 31 and 34, respectively, derive their power from the storage battery 19 of an internal combustion engine under test. This power supply, as explained above, delivers 105 volts D. C. to the plate 38 of the thyratron tube 34 through the series resistors 50 and 51. It maintains a constant 105 volt supply with input voltages from the storage battery of from 4 to 8 volts; thus a constant D. C. voltage is available throughout possible operating ranges which gives a constant plate current to be read on the meter 12 in the dwell indicator for absolute readings.

If a suitable negative D. C. voltage is applied to the grid 37 of the thyratron tube 34 before it is conducting, this bias will keep the tube extinguished and the plate milliampere reading zero. Now if the bias is reduced to zero, the tube conducts and the constants are such that the plate meter 12 reads full scale. Thus a circuit is provided which, under certain methods of connection to the primary circuit of a coil 54 of an automobile engine, will tend to read an average of some value between zero scale current and full scale current depending on the percentage of time the bias is applied to the grid 37 of the thyratron tube 34.

The tester is connected to an automobile ignition circuit in such a manner as to derive the aforementioned bias voltage between the red lead 53, which is connected to the ungrounded side of the battery 19 (which is always connected to one end of the primary coil 54 of the automobile engine), and the blue lead 55, which is connected to the other side of the primary coil 54 at the distributor, indicated generally at 56.

The double pole doublethrow switches 39 and 41 are connected into the circuit in such a manner to correct the polarity of the bias voltage according to whether the positive or negative terminal of the storage battery is grounded to the car frame. Thus when the ignition points of the distributor are closed, the full voltage of the storage battery is impressed across the primary of the ignition coil 54 and is transferred through the red lead 53 and blue lead 55 to the thyratron tube 34 through the reversing switch 39 to the grid 37 and cathode 36 of the thyratron tube 34 through the two 10,000 ohm limiting resistors 57 and 60, thus extinguishing the thyratron tube 34.

When the ignition points of distributor 56 open, the predominant transient voltage is positive, after which the ignition coil voltage drops to zero, which allows the thyratron tube 34 to conduct and oscillate, thus producing a series of impulses through the meter 12, which causes an average current to flow which is proportional to the time or angle the ignition points are open. Although this causes the meter scale to read from right to left, this connection was chosen as it gives a far superior result insofar as the secondary loading effects of the ignition coil 54 are concerned. In other words, the amplitude of the transient voltages in the primary of the ignition coil 54 have little or no effect on the accuracy of the readings on the meter 12.

The plate current meter 12 is marked off in degrees for six and eight lobe cams. The degrees refer to the number of degrees of rotation of the distributor cam shaft while the points remain in contact.

As shown in Figure 2, in order to start the tests, the red lead 53 is attached to the ungrounded connection of the battery 19, the black lead, shown at 58, is connected to a good ground 59 on the engine, and the blue lead 55 is connected to the primary terminal of the distributor 56. The polarity switch 15 is then turned to positive or negative ground as the case may be.

Figure 4:
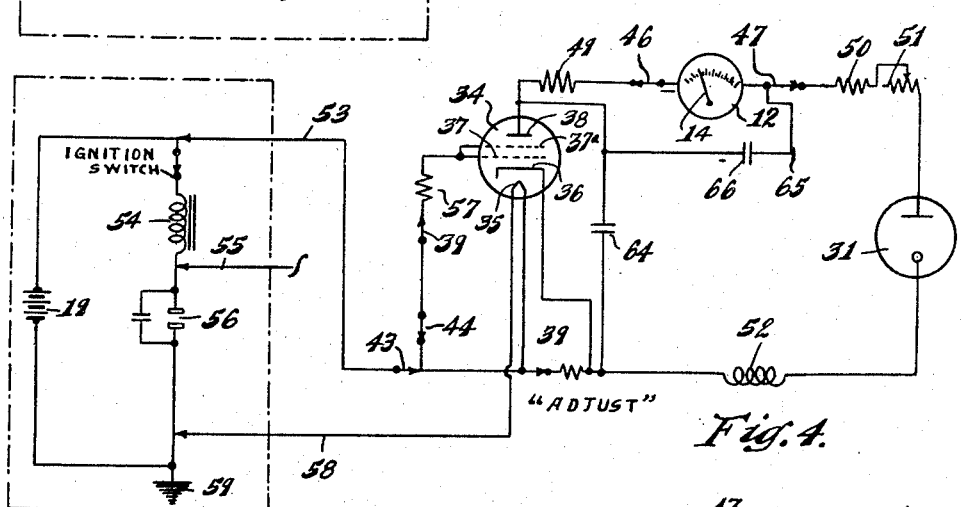
Fig. 4 is an electro-diagram of the active circuit when the tester is set to adjust the meter reading, the regulating vibrator portion of the circuit being omitted.

The selector switch 17 is then turned to "Adjust," thus establishing the circuit shown in Figure 4, by operating switches 43 to 47 inclusive. As will be apparent from the diagram, zero bias is applied to the grid 36 of the thyratron tube 34 and after a few seconds in which the circuit stabilizes, the pointer 14 will read near the minimum scale on the meter 12 at the "Adjust" line. The resistances 49, 50 and 51 are in circuit with the meter 12. If the pointer 14 is not on the "Adjust" line, the knob 16 is turned, thus varying the resistor 51 until the circuit is properly adjusted.

As shown in Figure 3, the circuit may now be used to determine whether the points are so badly burned that they must be replaced. The selector switch 17 is turned to the "Point Resistance" position and the ignition switch of the engine turned on, thereby placing the voltage appearing across the ignition points on the meter 12, shunted by resistor 61 and through an incandescent lamp 62, the purpose of which is described hereinafter. If the meter reads off scale, the points are open and must be closed by temporarily stepping on the starter. When the points are closed, the meter should read within the "Point Resistance OK" zone as shown at 63 on the meter 12, which indicates less than 1/10 of a volt drop across the points. If the pointer 14 is deflected beyond zone 63, the points have more than 1/10 volt drop and should be replaced.

Figure 5:
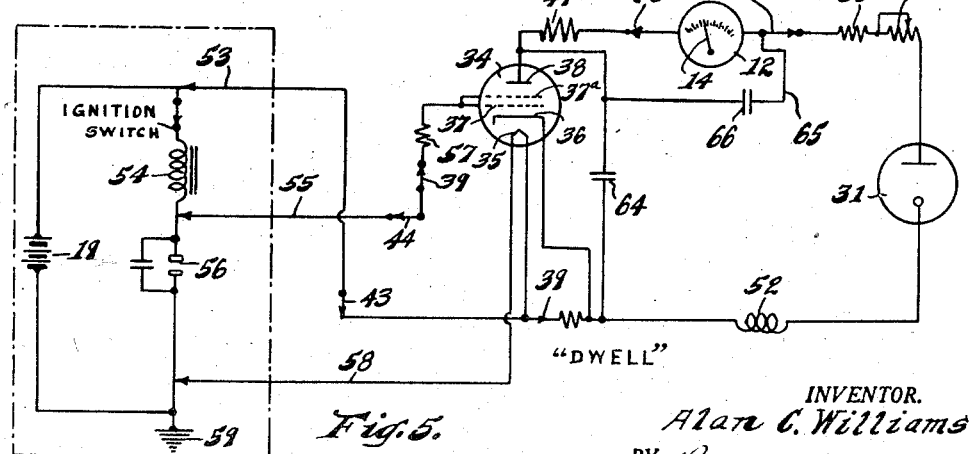
Fig. 5 is an electro-diagram of the active circuit when the tester is set to measure dwell or cam angle, the regulator vibrator portion of the circuit being omitted.

If the operator now wishes to test the dwell or cam angle, the selector switch 17 is turned to the "Dwell" position, thus establishing the circuit shown in Figure 5 by operating the switches 43 and 47 inclusive. As will be apparent, the meter resistances 49, 50 and 51 are in the circuit and the grid bias of the thyratron tube 34 is taken from the voltage appearing between leads 53 and 55, through the bias resistances 57 and 60. The ignition switch is then turned on and the engine is operated, first at starter speeds and then running normally.

Since the meter 12 reads at one end of the scale when the distributor points are continuously closed and at the other end of the scale when the distributor points are continuously open, the meter reads an average between the two extremes when the engine is running and the points are open and closing. This reading is constant regardless of engine speed; however, if the distributor shaft bearings are worn the meter indication will change with engine speed; and if the vacuum advance mechanism is worn, the meter reading may also change slightly when the engine is abruptly accelerated.

These changes indicating the mechanical condition of parts of the engine or distributor would not be evident if too much meter damping was utilized. However, the meter damping used is not sufficient to prevent the changes from showing on the meter 12 but is sufficient to steady the pointer 14 when the engine is running at starter speeds. The meter reading, when the engine is running, may be considered as the percentage of time the points remained closed and must, of course, be interpreted by reading the correct lobe scale 13 on the meter 12. If the dwell setting of the points is incorrect, it may be adjusted by removing the distributor cap, turning on the ignition switch and adjusting the points with a screw driver while the starter is being operated.

It will be seen from the foregoing description that I have used a regulated vibrator supply for high voltage to eliminate the necessity of a dry battery and give a higher plate supply voltage for the thyratron tube 34. This, in combination with the high series plate resistors 49, 50 and 51 used, eliminate drifting plate current with varying filament voltages, since changes in the plate resistance of the tube 34 are a relatively small percentage of the total circuit resistance. Furthermore, I have provided a novel relaxation oscillator for a thyratron tube which may be used in any circuit where D. C. current alone is available.

Another important feature of the invention resides in the use of the incandescent lamp 62, which may be any high resistance-temperature coefficient medium, in series with the meter 12, or meter and parallel shunt as shown at 65. The lamp 62 presents low resistance to currents flowing when reading low voltage on the meter 12 as a voltmeter, when testing point resistance, which voltage is of the order of 1/10 volts or less, and presents high resistance to current which would tend to flow at high voltages, which are of the order of 6 volts when the points are open. This protects the meter 12 against serious overload.

In the present application it is necessary to read the I. R. drop across the points of the primary ignition system as a means of determining the extent of the burning or pitting of the points. It is thus possible to read 1/10 of a volt at approximately 20% full scale and still have only a two to one overload current through the meter when the points are opened and 6 volts is applied to the meter circuit. With a conventional series resistor or multiplier, it would be necessary to go from 1/10 of a volt at 20% of full scale to a 12 times overload current through the meter at 6 volts, which would not be a safe practice.

It will be apparent that I have provided a distributor point tester for internal combustion engines in which the dwell angle readings are constant with varying input voltages of from 4 to 8 volts, and are constant regardless of secondary loading and engine speed. Furthermore, the tester does not load the primary circuit of the internal combustion engine to impair engine performance or to prevent starting. In addition, the operation of the tester is simple, a minimum of parts is utilized and the point resistance scale is easily read. The meter damping is such as to allow reading of dwell angle at starter speeds and yet not so great as to hide low frequency changes of dwell due to worn parts of the distributor.

Some changes may be made in the construction and arrangement of the parts of my distributor testing apparatus and circuit without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. A device for testing the dwell angle of the distributor points of an internal combustion engine including an ignition coil, said device comprising a direct current voltmeter having indicia thereon to give readings proportional to the time said points remain closed, a pulsating supply of direct current for said voltmeter to indicate the dwell angle in degrees, said pulsating supply of direct current being received from a circuit comprising a storage battery which also serves to supply the engine ignition coil, a glow tube, a thyratron tube, a regulated vibrator system including a rectifier tube and a transformer comprising primary and secondary windings, said thyratron and rectifier tubes including a filament and a plate, said rectifier tube also including a cathode, said thyratron tube also including a cathode and a grid, said storage battery supplying relatively low battery voltage to the filaments of said tubes and to the primary of said transformer, said regulated vibrator system supplying relatively high regulated voltage of direct current type to the plate of said thyratron tube and to the plate of said glow tube, a series of resistances in the plate circuit of the thyratron tube, said meter being connected in the plate circuit of said thyratron tube in series with said resistances, a source of low voltage supply from said battery through said points to the grid of said thyratron tube, a resistance in said circuit whereby cycling negative bias is impressed on said grid to periodically extinguish the thyratron tube when the points are closed, and a capacitor between the plate and the cathode of the thyratron tube, said capacitor cooperating with said thyratron tube to form a relaxtion oscillator.

2. A device for testing the dwell angle of the distributor points of an internal combustion engine including an ignition coil, said device comprising a direct current voltmeter having indicia thereon to give readings proportional to the time said points remain closed, a pulsating supply of direct current for said voltmeter to indicate the dwell angle in degrees, said pulsating supply of direct current being received from a circuit comprising a storage battery which also serves to supply the engine ignition coil, a glow tube, a thyratron tube, a regulated vibrator system including a rectifier tube and a transformer comprising primary and secondary windings, said thyratron and rectifier tubes each including a filament and a plate, said rectifier tube also including a cathode, said thyratron tube also including a cathode and a grid, said storage battery supplying relatively low battery voltage to the filament of said tubes and to the primary of said transformer, said regulated vibrator system supplying relatively high regulated voltage of direct current type to the plate of said thyratron tube and to the plate of said glow tube, a series of resistances in the plate circuit of the thyratron tube, said meter being connected in the plate circuit of said thyratron tube in series with said resistances, a source of low voltage supply from said battery through said points to the grid of said thyratron tube, a resistance in said circuit, whereby cycling negative bias is impressed on said grid to periodically extinguish the thyratron tube when the points are closed, and a capacitor between the plate and the cathode of the thyratron tube, said capacitor cooperating with said thyratron tube to form a relaxation oscillator, said device including a circuit for testing point resistance including a switch for removing said tubes and ignition coil from the circuit and for placing said meter in parallel with said points, so that when the points are closed the meter reads the voltage drop across the points, said switch also cutting out said series resistances and placing a resistance in the meter circuit, said last-mentioned resistance having a high positive temperature-resistance coefficient.

3. A device for testing the dwell angle of the distributor points of an internal combustion engine including an ignition coil, said device comprising a direct current voltmeter having indicia thereon to give readings proportional to the time said points remain closed, a pulsating supply of direct current for said voltmeter to indicate the dwell angle in degrees, said pulsating supply of direct current being received from a circuit comprising a storage battery which also serves to supply the engine ignition coil, a glow tube, a thyratron tube, a regulated vibrator system including a rectifier tube and a transformer comprising primary and secondary windings, said thyratron and rectifier tubes each including a filament and a plate, said rectifier tube also including a cathode, said thyratron tube also including a cathode and a grid, said storage battery supplying relatively low battery voltage to the filaments of said tubes and to the primary of said transformer, said regulated vibrator system supplying relatively high regulated voltage of direct current type to the plate of said thyratron tube and to the plate of said glow tube, a series of resistances in the plate circuit of the thyratron tube, said meter being connected in the plate circuit of said thyratron tube in series with said resistances, a source of low voltage supply from said battery through said points to the grid of said thyratron tube, a resistance in said circuit whereby cycling negative bias is impressed on said grid to periodically extinguish the thyratron tube when the points are closed, and a capacitor between the plate and the cathode of the thyratron tube said capacitor cooperating with said thyratron tube to form a relaxation oscillator, said device including a circuit for testing point resistance including a switch for removing said tubes and ignition coil from the circuit and for placing said meter in parallel with said points, so that when the points are closed the meter reads the voltage drop across the points, said switch also cutting out said series resistances and placing in the meter circuit a resistance having a high positive temperature-resistance coefficient, and a variable resistance in shunt to said meter.

4. A device for testing the dwell angle of the distributor points of an internal combustion engine including an ignition coil, said device comprising a direct current voltmeter, a pulsating supply of direct current for said voltmeter to indicate the dwell angle in degrees, said pulsating supply of direct current being received from a circuit comprising a storage battery which also serves to supply the engine ignition coil, a glow tube, a thyratron tube, a regulated vibrator system including a rectifier tube and a transformer comprising primary and secondary windings, said thyratron and rectifier tubes each including a filament and a plate, said rectifier tube also including a cathode, said thyratron tube also including a cathode and a grid, said storage battery supplying relatively low battery voltage to the filaments of said tubes and to the primary of said transformer, said regulated vibrator system supplying relatively high regulated voltage of direct current type to the plate of said thyratron tube and to the plate of said glow tube, a series of resistances in the plate circuit of the thyratron tube, said meter being connected in the plate circuit of said thyratron tube in series with said resistances, a source of low voltage supply from said battery through said points to the grid of said thyratron tube, a resistance in said circuit whereby cycling negative bias is impressed on said grid to periodically extinguish the thyratron tube when the points are closed, and a capacitor between the plate and the cathode of the thyratron tube said capacitor forming with said thyratron tube a relaxation oscillator, said device including means affording stabilization of said circuit at the beginning of a test with said points closed and means for adjusting said meter to zero dwell angle after stabilization.

5. A device for testing the dwell angle of the distributor points of an internal combustion engine including an ignition coil, said device comprising a direct current voltmeter, a pulsating supply of direct current for said voltmeter to indicate the dwell angle in degrees, said pulsating supply of direct current being received from a circuit comprising a storage battery which also serves to supply the engine ignition coil, a glow tube, a thyratron tube, a regulated vibrator system including a rectifier tube and a transformer comprising primary and secondary windings, said thyratron and rectifier tubes each including a filament and a plate, said rectifier tube also including a cathode, said thyratron tube also including a cathode and a grid, said storage battery supplying relatively low battery voltage to the filament of said tubes and to the primary of said transformer, said regulated vibrator system supplying relatively high regulated voltage of direct current type to the plate of said thyratron tube and to the plate of said glow tube, a series of resistances in the plate circuit of the thyratron tube, said meter being connected in the plate circuit of said thyratron tube in series with said resistances, a source of low voltage supply from said battery through said points to the grid of said thyratron tube, a resistance in said circuit whereby cycling negative bias is impressed on said grid to periodically extinguish the thyratron tube when the points are closed, and a capacitor between the plate and the cathode of the thyratron tube, said capacitor forming with said thyratron tube a relaxation oscillator, said device including means affording stabilization of said circuit at the beginning of a test with the points closed, said last means including switching means for placing the thyratron tube, meter and series resistances across a circuit including said battery, points and ignition coil and means for adjusting said meter to zero dwell angle after stabilization.

6. A device for testing the dwell angle of the distributor points of an internal combustion engine including an ignition coil and comprising a direct current voltmeter, a pulsating supply of direct current for said voltmeter to indicate the dwell angle in degrees, said pulsating supply of direct current being received from a circuit comprising a storage battery which also serves to supply the engine ignition coil, a glow tube, a thyratron tube, a regulated vibrator system including a rectifier tube and a transformer comprising primary and secondary windings, said thyratron and rectifier tubes each including a filament and a plate, said rectifier tube also including a cathode, said thyratron tube also including a cathode and a grid, said storage battery supplying relatively low battery voltage to the filaments of said tubes and to the primary of said transformer, said regulated vibrator system supplying relatively high regulated voltage of direct current type to the plate of said thyratron tube and to the plate of said glow tube, a series of resistances in the plate circuit of the thyratron tube, said meter being connected in the plate circuit of said thyratron tube in series with said resistances, a source of low voltage supply from said battery through said points to the grid of said thyratron tube, a resistance in said circuit whereby cycling negative bias is impressed on said grid to periodically extinguish the thyratron tube when the points are closed, and a capacitor forming with said thyratron tube a relaxation oscillator, said device including a circuit for testing point resistance having a switch for removing said tubes and ignition coil from the circuit and for placing said meter in series with said points so that when the points are closed the meter reads the voltage drop across the points, said switch also cutting out said series resistances and placing a resistance in the meter circuit, having a high positive temperature-resistance coefficient, said device including means affording stabilization of said circuit at the beginning of a test with said points closed and means for adjusting said meter to zero dwell angle after stabilization.

7. In a system for measuring the dwell angle of distributor contacts, a low voltage direct current source connected in series with the distributor contacts and with the primary winding of an ignition coil, a thyratron tube having a plate, a control grid, a cathode and a cathode-heating filament, a plate-cathode circuit for said tube having external resistance in series with said plate and cathode, which external resistance is several times the internal plate resistance of the tube, a direct current meter included in said circuit in series with said external resistance, means for converting low voltage direct current from said source into relatively high voltage direct current and for impressing said high voltage direct current upon said circuit in series with said meter and the plate and cathode of said tube, said filament being connected to and energized by said low voltage source, a capacitor operatively associated with said tube to form therewith a relaxation oscillator having a frequency substantially higher than the maximum operating frequency of said distributor contacts, and a grid-cathode circuit for said tube including said low voltage source and said distributor contacts in series, said grid-cathode circuit being operative to render said grid more negative when said contacts are closed, the normal potential of said grid being such as to sustain the operation of said relaxation oscillator, whereas its potential, when said contacts are closed, is sufficiently negative to block re-establishment of plate current through said tube whenever the plate current therethrough is interrupted, but insufficiently negative to otherwise interrupt said plate current, said meter being deflectable proportionately to average current flow through said plate-cathode circuit and calibrated to indicate the ratio of closed to open time of said distributor contacts.

8. In a system for measuring the dwell angle of distributor contacts, a low voltage direct current source connected in series with the distributor contacts and with the primary winding of an ignition coil, a thyratron tube having a plate, a control grid, a cathode and a cathode-heating filament, a plate-cathode circuit for said tube having external resistance in series with said plate and cathode, which external resistance is several times the internal plate resistance of the tube, a D. C. meter included in said circuit in series with said external resistance, means for converting low voltage direct current from said source into relatively high voltage direct current and for impressing said high voltage direct current upon said circuit in series with said meter and the plate and cathode of said tube, said means including a step-up transformer having a secondary winding and a primary winding connected to said low voltage source through a periodically operating reversing switch, a rectifier connected to said secondary winding for rectifying the output thereof, and a filter and voltage regulator for converting the pulsating D. C. output of said rectifier into direct current of substantially constant voltage, said filament being connected to and energized by said low voltage source, a capacitor interconnecting the plate and cathode of said tube to form with said tube a relaxation oscillator having a frequency substantially higher than the maximum operating frequency of said distributor contacts, and a grid-cathode circuit including said low voltage source and said distributor contacts in series arranged to render said grid more negative whenever said contacts are closed, the normal open-contact potential of said grid being such as to sustain the operation of said relaxation oscillator, said grid being rendered sufficiently negative in response to each closure of said contacts to block re-establishment of plate current through said tube whenever the plate current therethrough is interrupted, but insufficiently negative to otherwise interrupt said plate current, said meter being deflectable proportionately to average current flow through said plate-cathode circuit and calibrated to indicate the ratio of closed to open time of said distributor contacts.

ALAN C. WILLIAMS.

REFERENCES CITED

The following references are of record in the file of this patent:

UNITED STATES PATENTS

| Number | Name | Date |
|---|---|---|
| 1,900,215 | Wilson | Mar. 7, 1933 |
| 2,006,737 | Gessford | July 2, 1935 |
| 2,096,427 | Gulliksen | Oct. 19, 1937 |
| 2,097,066 | Hoover | Oct. 26, 1937 |
| 2,100,700 | Schlesinger | Nov. 30, 1937 |
| 2,232,715 | Matthews | Feb. 25, 1941 |
| 2,254,175 | Eltgroth | Aug. 26, 1941 |
| 2,351,441 | Makuh | June 13, 1944 |
| 2,354,086 | MacKay | July 18, 1944 |
| 2,371,636 | McConnel | Mar. 20, 1945 |

FOREIGN PATENTS

| Number | Country | Date |
|---|---|---|
| 488,842 | Great Britain | July 14, 1938 |